United States Patent [19]

Aoki et al.

[11] Patent Number: 5,123,382
[45] Date of Patent: Jun. 23, 1992

[54] INTAKE SYSTEM FOR A COMBUSTION ENGINE

[75] Inventors: Motoi Aoki; Toshikazu Kurokawa; Fusatosi Tanaka; Kouji Matsuura, all of Hiroshima, Japan

[73] Assignee: Mazda Motor Corporation, Hiroshima, Japan

[21] Appl. No.: 678,201

[22] Filed: Apr. 1, 1991

[30] Foreign Application Priority Data

Mar. 31, 1990 [JP] Japan .................................. 2-85808

[51] Int. Cl.$^5$ .......................................... F02M 35/10
[52] U.S. Cl. ........................ 123/52 MB; 123/52 MV
[58] Field of Search ......... 123/52 M, 52 MB, 52 MC, 123/52 MV, 52 MF, 52 ML

[56] References Cited

U.S. PATENT DOCUMENTS

| | | | |
|---|---|---|---|
| 4,722,307 | 2/1988 | Okuno et al. | 123/52 M |
| 4,919,087 | 4/1990 | Ogani et al. | 123/52 MV |
| 4,957,071 | 9/1990 | Matsuo et al. | 123/52 MV |
| 4,977,865 | 12/1990 | Hiraoka et al. | 123/52 MB |

FOREIGN PATENT DOCUMENTS 0208560  8/1989  Japan .................................. 123/52 M Primary Examiner—David A. Okonsky
Attorney, Agent, or Firm—Fish & Richardson

[57] ABSTRACT

An intake system for an engine allows supercharging using the dynamic effect of intake air has a surge tank for a cylinder group in which cylinders are ignited in a sequence discontinuous with each other, a second surge tank for another cylinder group in which cylinders are ignited in a sequence discontinuous with each other, a first upstream intake passage for supplying intake air to the first surge tank, a second upstream intake passage for supplying intake air to the second surge tank, a connecting tank for communicating intermediate portions of the individual intake passages with each other, and a short connecting passage for communicating upstream portions of the first upstream intake passage and the second upstream intake passage with the connecting tank 9. When the number of engine revolution is high, intake air is supplied to each of the cylinders through the connecting tank and the individual intake passage by taking advantage of the short connecting passage and bypassing a long upstream intake passage and the surge tank. Further, the short connecting passage does not adversely affect the effect to be produced by resonant supercharging because the upstream portion of the intake passage is communicated with the connecting tank. The intake system can shorten the length of passage for supplying intake air when the number of engine revolution is high due to inertia supercharging, without sacrificing the effect to be achieved by resonant supercharging.

14 Claims, 2 Drawing Sheets

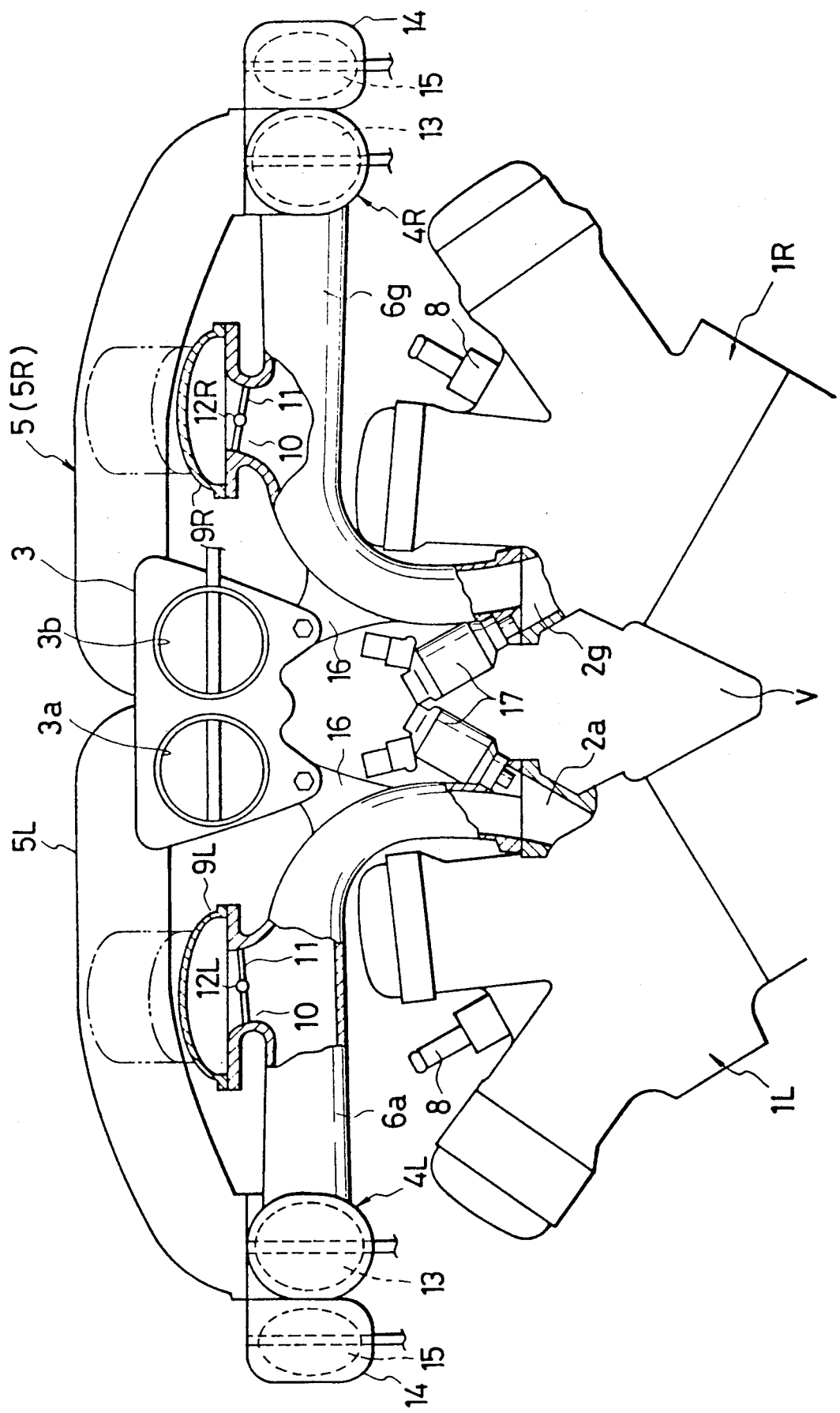

INTAKE SYSTEM FOR A COMBUSTION ENGINE

BACKGROUND OF THE INVENTION

1. Field of the Invention

The present invention relates to an intake system for a combustion engine.

2. Discription of Related Art

Recently, there is the increasing tendency that combustion engines take advantage of dynamic effects of intake air, particularly inertia superchanging. As disclosed in Japanese Patent Laid-open Publication (kokai) No. 40,724/1985, a surge tank is connected to each of cylinders by the respectively individual (independent) intake passage, thereby allowing the surge tank to be employed as a section for reversing pressure. It is noted that the longer the length of the individual intake passage ranging from the respective cylinder to the pressure reversing section, the lower the number of revolutions for the synchronization with inertia for supercharging.

In order to implement the inertia supercharging, the number of engine revolution in synchronization with inertia supercharging is changed by opening or closing a shutter valve interposed between a connecting tank and each of the individual intake passage in accordance with the number of engine revolution, a connecting tank disposed to communicate an intermediate portion of each of individual intake passages to each other. In other words, when the number of engine revolution becomes too large, the shutter valve is opened to thereby allow the connecting tank to be employed as the section for reversing the pressure for inertia supercharging.

Resonant supercharging is also implemented as a dynamic supercharging of intake air. In this case, there are disposed a first merging section communicated independently and individually with each of the cylinders of a cylinder group in which the order or sequence of ignition is not continuous from each other, on the one hand, and a second merging section communicated independently and individually with each of the cylinders of a cylinder group in which the order or sequence of ignition is not continuous from each other, on the other hand. Further, there are disposed a first upstream-ream intake passage for supplying intake air to the first merging section and a second upstream intake passage for supplying intake air to the second merging section. And the upstream merging section for the two upstream intake passages is employed as a section for reversing pressure, i.e. the upstream intake passage is employed as a passage for resonance.

It is also possible to arrange an intake system for both of the inertia supercharging and the resonant supercharging. In this case, the connecting tank for the inertia supercharging communicates the individual intake passages with each other on the downstream sides of the first and second merging sections. The resonant supercharging is so set as to be synchronized with the engine revolution in a region in which the number of engine revolution is low, on the one hand, and the inertia supercharging is so as to be in tune with the engine revolution in a region in which the number of engine revolution is high, on the other hand. At this end, the first and second upstream intake passage for a resonant passage is rendered considerably long.

It is noted, however, that in order to allow the inertia supercharging at the time when the number of engine revolution engine is high, intake air is supplied to each of the cylinders from the respective individual intake passages through the upstream intake passage of a long length so that the length of the passage through which the intake air flows becomes extremely long. This is disadvantageous for imparting high output and for ensuring a good response. With these matters taken into account, it is considered to shorten the upstream intake passage, however, a desired number of engine revolution for the synchronization with the inertia supercharging cannot be attained, thereby allowing no sufficient resonant supercharging.

SUMMARY OF THE INVENTION

Therefore, the object of the present invention is to provide an intake system for a combustion engine so adapted as to shorten the length of passage for supplying intake air to a great extent at the time of the number of engine revolution being high when the connecting tank is employed as the pressure reversing section for the inertia supercharging, without sacrificing the effect to be achieved by the resonant supercharging, when there are implemented the resonant supercharging and the inertia supercharging using the connecting tank.

In order to achieve the aforesaid object, the present invention consists of an intake system for a combustion engine, comprising, comprising:

a first merging section communicated through respective individual intake passages individually and separately with each of cylinders of one cylinder group in which the cylinders are ignited in a sequence discontinuous with each other;

a second merging section communicated through respective individual intake passages or through respective individual intake passages individually and separately with each of cylinders of another cylinder group in which the cylinders are ignited in a sequence discontinuous with each other or with each of cylinders of another cylinder group in which the cylinders are ignited in a sequence discontinuous with each other;

a first upstream intake passage for supplying intake air to the first merging section;

a second upstream intake passage for supplying intake air to the second merging section;

a connecting tank communicating an intermediate portion of each of the individual intake passages with each other; and a short connecting passage communicating each of an upstream portion of the first upstream intake passage and the second upstream intake passage with the connecting tank.

The arrangement of the present invention enables intake air to be supplied from the connecting tank to each of the cylinders through the respective individual intake passage by using a short-length connecting passage while bypassing the long-length upstream intake passage and the merging section and by using a short-length connecting passage, when the number of engine revolution is high. Hence, the length of the passage for supplying intake air is made extremely short as well as output and response is improved to a great extent.

Further, the connecting passage communicates the connecting tank with the upstream portions of the first and second upstream intake passages, so that the disposition of the connecting passage does not adversely affect the resonant supercharging, thereby implementing the resonant supercharging in such a state as close to an ideal state.

Other objects, features and advantages of the present invention will become apparent in the course of the description of the preferred embodiments, which follows, with reference to the accompanying drawings.

FIG. 2 is a front elevational view, with a portion cut away, of the combustion engine of FIG. 1.

DESCRIPTION OF THE PREFERRED EMBODIMENTS

Figure 1:
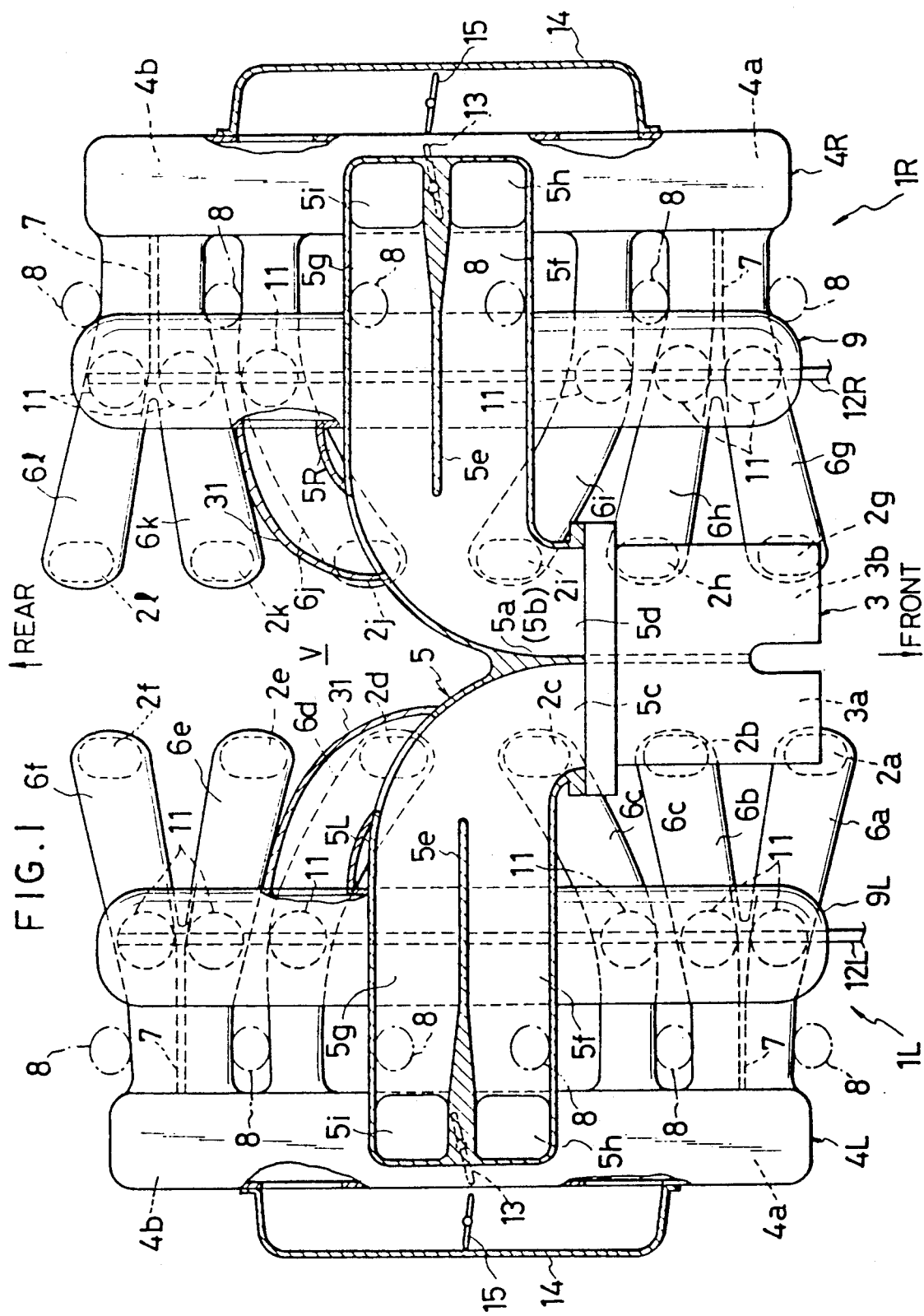
FIG. 1 is a top plan view of a combustion engine for use in an automotive vehicle according to the present invention.

In describing some preferred embodiments of the present invention, reference will be made to an 12-cylinder automobile internal combustion engine of a type comprising a cylinder block having two cylinder banks in a V-shaped configuration with in-line six cylinders in each bank.

Referring first to FIGS. 1 and 2 showing the first preferred embodiment of the present invention, an engine cylinder block is shown to have left-hand and right-hand cylinder banks 1L and 1R extending parallel to each other on respective side of a longitudinal sense of the engine cylinder block. Each of those left-hand and right-hand cylinder banks has six in-line combustion chambers defined therein and having respective intake ports. The intake ports communicated with the combustion chambers in the left-hand cylinder bank are identified by 2a, 2b, 2c, 2d, 2e and 2f, respectively, while the intake ports communicated with the combustion chambers in the right-hand cylinder bank are indentified by 2g, 2h, 2i, 2j, 2k and 2l, respectively.

The engine cylinder block has a throttle casing 3 mounted thereon and positioned between the left-hand and right-hand cylinder banks 1L and 1R and adjacent a front end of the engine cylinder block with respect to the direction of forward run of the automotive vehicle (or a lower portion of the drawing of FIG. 1). The throttle casing 3 has a hollow divided by a partition wall so as to define left-hand and right-hand throttle passages 3a and 3b in association with the left-hand and right-hand cylinder banks 1L and 1R, respectively, and includes throttle valves operatively disposed in the left-hand and right-hand throttle passages 3a and 3b, respectively.

Positioned upward of the left-hand and right-hand cylinder banks 1L and 1R and on respective sides of a generally V-shaped longitudinal center space V delimited between the left-hand and right-hand cylinder banks 1L and 1R are generally elongated left-hand and right-hand surge tanks 4L and 4R, respectively, each of said surge tanks 4L and 4R extending in a direction generally parallel to a crank axis along which a crankshaft extends, or the longitudinal sense of the engine cylinder block. The surge tanks 4L and 4R are communicated with the throttle passages 3a and 3b in the throttle casing 3 through an upstream intake manifold 5 as will be described subsequently in detail.

The upstream intake maniford 5 comprises a merging region 5a extending a small distance from a rear end of the throttle casing 3 in a direction parallel to the crank axis referred to above, and a pair of branch ducts 5L and 5R branched off from the merging region 5a so as to extend towards the left-hand and right-hand surge tanks 4L and 4R, respectively. The merging region 5a is of a design progressively increasing in elevation so as to incline upwards in a direction close towards the rear of an automobile body structure at an angle of inclination generally conforming to the angle of inclination of a hingedly supported bonnet or hood adapted to selectively close and open an access opening leading to an engine room in the automobile body structure. An open end of the left-hand branch duct 5L remote from the throttle casing 3 is fluid-connected with that portion of an upper wall of the left-hand surge tank 4L which is generally intermediate of the length of such left-hand surge tank 4L, whereas an open end of the right-hand branch duct 5R remote from the throttle casing 3 is fluid-connected with that portion of an upper wall of the right-hand surge tank 4R which is generally intermediate of the length of such right-hand surge tank 4R. Respective connections between the branch ducts 5L and 5R and those intermediate portions of the upper walls of the surge tanks 4L and 4R are generally indentified by 5h and 5i in FIG. 1.

The merging region 5a of the upstream intake manifold 5 has a partition wall 5b dividing the interior thereof into left-hand and right-hand passages 5c and 5d which are in communication with the left-hand and right-hand throttle passages 3a and 3b defined within the throttle casing 3, respectively. Similarly, each of the branch ducts 5L and 5R has its hollow divided into two passages 5f and 5g by means of a partition wall 5e extending from one end of the respective branch duct 5L and 5R adjacent the associated surge tank 3L and 3R and terminating adjacent the merging region 5a.

The left-hand surge tank 4L and the fuel intake ports 2a, 2b, 2c, 2d, 2e and 2f in the left-hand cylinder bank 1L are communicated with each other through individual intake passages 6a, 6b, 6c, 6d, 6e and 6f which extend from a side wall of the left-hand surge tank 4L confronting the longitudinal center space V to the respective fuel intake ports 2a to 2f, having passed underneath the upstream intake manifold 5, specifically the left-hand fuel intake duct 5l. Similarly, the right-hand surge tank 4R and the fuel intake ports 2g to 2l in the right-hand cylinder bank 1R are communicated with each other through individual intake passages 6g, 6h, 6i, 6j, 6k and 6l which extend from a side wall of the right-hand surge tank 4R confronting the longitudinal center space V to the respective fuel intake ports 2a to 2l, having passed underneath the upstream intake manifold 5, specifically the right-hand fuel intake duct 5R.

Two of the individual intake passages 6a to 6f which are positioned adjacent the left-hand fuel intake duct 5L, that is, the intake passages 6c and 6d, are in practice defined in a single suction piping independent of the associated surge tank 4L, while two of the individual intake passages 6g to 6l which are positioned adjacent the right-hand fuel intake duct 5R, that is, the individual intake passages 6i and 6j, are similarly defined in a single suction piping independent of the associated surge tank 4R. On the other hand, the remaining four intake passages 6a, 6b, 6e and 6f positioned remote from the associated left-hand fuel intake duct 5L have their end portions adjacent the associated surge tank 4l which are defined in a common suction piping, while the remaining four intake passages 6g, 6h, and 6l positioned remote from the associated right-hand fuel intake duct 5R have their end portions adjacent the associated surge tank 4R which are defined in a common suction piping.

In other words, the intake passages 6a and 6b are in practice defined in a generally Y-shaped piping which comprises a common piping portion adjacent the surge tank 4L and divided by a partition wall 7 into two passage portions which form respective parts of the intake passages 6a and 6b. Similarly, the intake passage 6d and 6e are in practice defined in a generally Y-shaped piping which comprises a common piping portion adjacent the surge tank 4L and divided by a partition wall 7 into two passage portions which form respective parts of the intake passages 6d and 6e. The intake passages 6g and 6h are in pratice defined in a generally Y-shaped piping which comprises a common piping portion adjacent the surge tank 4R and divided by a partition wall 7 into two passage portions which form respective parts of the intake passages 6g and 6h. Finally, the intake passages 6j and 6k are in practice defined in a generally Y-shaped piping which comprises a common piping portion adjacent the surge tank 4R and divided by a partition wall 7 into two passage portions which form respective parts of the intake passages 6j and 6k. By the employment of this design, an access to ignition plugs 8 associated with the left-hand and right-hand cylinder banks 1L and 1R, as shown by the phantom lines in FIG. 1 is possible without being interfered by the presence of the individual intake passages 6a to 6l.

A generally elongated connecting tank 9L is mounted above the left-hand cylinder bank 1L so as to extend generally parallel to the adjacent surging tank 4L in a space delimited between the branch duct 5l and a left-hand group of the intake passages 6a to 6f. As best shown in FIG. 2, this connecting tank 9L is communicated with the intake passages 6a to 6f of the left-hand group through respective short passages 10 each having a respective shutter valve 11 pivotally supported therein by means of a common pivot shaft 12 that extends generally over the length of the connecting tank 9L. Similarly, a generally elongated connecting tank 9R is mounted above the right-hand cylinder bank 1R so as to extend generally parallel to the adjacent surging tank 4R in a space delimited between the branch duct 5R and a right-hand group of the intake passages 6g to 6l, and is communicated with the intake passages 6g to 6l through respective short passages 10 each having a respective shutter valve 11 pivotally supported by means of a common pivot shaft 12 which extends generally over the length of the connecting tank 9R. As will be discussed later, those shutter valves 11 serve to adjust or change the number of engine revolution for the synchronism with an intertia supercharging.

Each of the connecting tanks 9L and 9R is of a design wherein, in order to secure as large a volume as possible without adversely affecting the positioning of the associated branch duct 5L or 5R, a generally intermediate portion of the respective connecting tank 9L or 9R immediately beneath the associated branch duct 5L or 5R is substantially flattened as best shown by the solid line in FIG. 2 while portions thereof on respective sides of the associated branch duct 5L or 5R are generally radially outwardly enlarged so as to assume maximum sectional areas as shown by double-dotted chain lines in FIG. 2. However, front and rear end portions of the respective connecting tank 9L or 9R are again flattened progressively as the distance increases away from the associated branch duct 5L or 5R as shown by single-dotted chain lines in FIG. 2.

Each of the left-hand and right-hand surging tanks 4L and 4R has a choke valve 13 disposed therein at a location substantially intermediate of the length thereof for pivotal movement between opened and closed position with respect to the direction of the cranking axis or the longitudinal sense of the engine cylinder block. Each choke valve 13 is operable to adjust or change the number of engine revolution for the synchronization with a resonant supercharging and, when held in the closed position, divides the interior of the associated surging tank 4L or 4R into two chambers. In other words, so long as the respective choke valve 13 is in the opened position, only one chamber is defined within the associated surging tank 4L or 4R.

More specifically, referring to the left-hand surging tank 4L for the purpose of clarity, the intake passages 6a to 6f are communicated with each other through the single chamber in the surging tank 4L when and so long as the choke valve 13 is in the opened position, but when the choke valve 13 is pivoted to the closed position, the interior of the surging tank 4L is divided into two chambers 4a and 4b (or 4c and 4d), the chamber 4a being communicated with the intake passages 6a to 6c while the chamber 4b is communicated with the intake passages 6d to 6f. On the other hand, the two passages 5g and 5f of the left-hand branch duct 5L open into the interior of the associated surging tank 4L at respective locations each on one side of the choke valve 13 and, therefore, when the choke valve 13 is in the closed position dividing the interior of the surging tank 4L into the chambers 4a and 4b, air to be mixed with fuel which is then flowing through the passages 5g and 5f of the branch duct 5L is supplied into the chambers 4a and 4b.

A similar description made to the left-hand surging tank 4L can equally apply to the right-hand surging tank 4R. Briefly speaking, when and so long as the choke valve 13 in the right-hand surging tank 4R is in the closed position, air to be mixed with fuel which is then flowing through the passages 5g and 5f of the right-hand branch duct 5R is supplied into chambers 4a and 4b within the right-hand surging tank 4R.

Assuming that the choke valve 13 in each of the left-hand and right-hand surging tanks 4L and 4R is in the closed position, the chambers 4a and 4b in the respective surging tank 4L and 4R are communicated with each other through an associated connecting passage 24 having a choke valve 15 disposed therein at a location substantially intermediate of the length thereof for the adjustment of the number of engine revolution for the synchronization with a resonant supercharging. The respective connecting passage 14 has a length chosen to be smaller than the length of the partition wall 5e formed within the associated branch duct 5L or 5R so as to define the passages 5f and 5g.

It is to be noted that the throttle casing 3 is rigidly mounted on stays 16 which are integrally formed with respective walls of the intake passages 6a, 6b, 6g and 6h. It is also to be noted that reference numeral 17 employed in FIG. 2 represent fuel injection nozzles through which fuel is injected into the associated combustion chambers.

The connecting tank 9L is communicated to the inside of the left-hand associated branch duct 5L through a short connecting passage 31 which in turn has an opening at a location immediately on the upstream side of the passages 5f and 5g of the left-hand associated branch duct 5L. The connecting passage 31 is so arranged as to be as short as possible and disposed in the vicinity of a location at which the left-hand associated branch duct 5L approches to the connecting tank 9L to the closest extent. Likewise, the connecting tank 9R is communicated with the right-hand associated branch duct 5R through the connecting passage 31.

Dynamic effects of intake air brought about by the operation of the valves 11, 13 and 15 will now be discussed. However, for the purpose of a better understanding thereof, the firing sequence of the combustion chambers is assumed such that the combustion chambers communicated respectively with the intake passages 6a to 6c will not be fired immediately one after another; the combustion chamber communicated respectively with the intake passages 6d to 6f will not be fired immediately one after another; the combustion chambers communicated respectively with the intake passages 6g to 6i will not be fired immediately one after another; and the combustion chambers communicated respectively with the intake passages 6j to 6l will not be fired immediately one after another.

Thus, the chamber 4a of the left-hand surge tank 4L for the three cylinders connected to the respective intake ports 2a, 2b and 2c and communicated with the respective individual (independent) intake passages 6a, 6b and 6c comprises a merging portion of the three individual (independent) intake passages 6a, 6b and 6c. The chamber 4b of the left-hand surge tank 4L for the three cylinders connected to the respective intake ports 2d, 2e and 2f communicated with the respective individual (independent) intake passages 6d, 6e and 6f. Further, the chamber 4a of the right-hand surge tank 4R for the three cylinders connected to the respective intake ports 2g, 2h and 2i and communicated with the respective individual (independent) intake passages 6a, 6b and 6c comprises a merging portion of the three individual (independent) intake passages 6g, 6h and 6i, while the chamber 4b of the right-hand surge tank 4R for the three cylinders connected to the respective intake ports 2j, 2k and 2l and communicated with the respective individual (independent) intake passages 6j, 6k and 6l.

(1) When the number of revolutions of the combustion engine is lower than 3,500 rpm, all of the valves 11, 13 and 14 are closed and, therefore, a resonant supercharging takes place with respective portions of the branch ducts 5L and 5R upstream of the associated partition walls 5e being utilized as pressure reversing portions (i.e., a resonant supercharging takes place with the passages 5f and 5g utilized as resonant passages).

(2) When the number of revolutions of the combustion engine is within the range of 3,500 to 4,500 rpm, the valves 11 and 13 are closed and only the valves 15 are opened and, therefore, the resonant supercharging takes place with the connecting passages 14 utilized as resonant passages.

(3) When the number of revolutions of the combustion engine is within the range of 4,500 to 5,500 rpm, only the valves 11 are closed and the valves 13 and 15 are opened. In this condition, an inertia supercharging takes place with the surge tanks 4L and 4R used as pressure reversing portions.

(4) When the number of revolutions of the combustion engine is higher than 5,500 rpm, all of the valves 11, 13 and 15 are opened. In this condition, the inertia supercharging takes place with the connecting tanks 9 being utilized as pressure reversing portions.

In the modes described by items (1) to (3), intake air is fed to the individual intake passages 6a to 6l, inclusive, throught the surge tanks 4L or 4R, thereby lengthening the passage for supplying the intake air. In the mode as described by item (4) above, intake air is supplied to the individual intake passages 6a to 6l, inclusive, through the connecting tank 9L or 9R from the connecting passage 31 by bypassing the passages 5f or 5g or the surge tank 4L or 4R, thereby shortening the length of passage through which the intake air is fed.

Although the present invention has been fully described in connection with the preferred embodiments thereof with reference to the accompanying drawings which are used only for the purpose of illustration, those skilled in the art will readily concieve numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. An intake system for a combustion engine, comprising:
   a first merging section comprising a first plurality of individual intake passages each of which communicates individually and separately with a cylinder in a first cylinder group, wherein the cylinders in said first cylinder group are ignited in a sequence discontinuous with each other;
   a second merging section comprising a second plurality of individual intake passages each of which communicates individually and separately with a cylinder in a second cylinder group, wherein the cylinders in said second cylinder group are ignited in a sequence discontinuous with each other;
   a first upstream intake passage for supplying intake air to the first merging section;
   a second upstream intake passage for supplying intake air to the second merging section;
   a first connecting tank communicating with an intermediate portion of each of the individual intake passages of the first merging section;
   a second connecting tank communicating with an intermediate portion of each of the individual intake passages of the first merging section;
   a first short connecting passage communicating with an upstream portion of the first upstream intake passage and the first connecting tank; and
   a second short connecting passage communicating with an upstream portion of the first upstream intake passage and the second connecting tank.

2. An intake system as claimed in claim 1, wherein a shutter valve for opening or closing a connection between each of the individual intake passages and the respective connecting tank is disposed between each of the individual intake passages and the respective connecting tank.

3. An intake system as claimed in claim 2, wherein at least two of the shutter valves are mounted on a common rotary shaft.

4. An intake system as claimed in claim 2, wherein the combustion engine is a V-type combustion engine having a first cylinder bank and a second cylinder bank disposed in a V-shaped form, and wherein the cylinders in the first cylinder group are disposed in the first cylinder bank and the cylinders in the second cylinder group disposed in the second cylinder bank.

5. An intake system as claimed in claim 4, wherein the first merging section and the second merging section comprise respectively first and second surge tanks disposed parallel to each other in a V-shaped manner as to face a V-shaped central space.

6. An intake system as claimed in claim 5, wherein the first surge tank is disposed on one side of the combustion engine and the second surge tank is disposed on other side of the combustion engine.

7. An intake system as claimed in claim 6, wherein:
a throttle casing is disposed in the V-shaped central space; and
the first upstream intake passage and the second upstream intake passage are connected to the throttle casing.

8. An intake system as claimed in claim 7, wherein:
the first connecting tank is interposed between the first upstream intake passage and the corresponding independent intake passage at a location underneath the first upstream intake passage and above the individual intake passages communicated with each of the respective cylinder of the first cylinder bank; and
the second connecting tank is interposed between the second upstream intake passage and the corresponding independent intake passage at a location underneath the second upstream intake passage and above the individual intake passages communicated with each of the respective cylinders of the second cylinder bank.

9. An intake system as claimed in claim 2, wherein the combustion engine is a V-type combustion engine having a first cylinder bank and a second cylinder bank disposed in a V-shaped manner, each of the first and second cylinder banks having cylinders of the first cylinder group and cylinders of the second cylinder group.

10. An intake system as claimed in claim 9, wherein the first merging section and the second merging section comprise respectively first and second surge tanks disposed parallel to each other in a V-shaped manner as to face a V-shaped central space;
wherein a first opening-closing valve is disposed in a generally middle portion of each of the first and second surge tanks in a direction parallel to a crank axis; and
wherein a chamber is defined within each of the surge tanks when the first opening-closing valve is opened and two chambers within each of the surge tanks are formed when the first opening-closing valve is closed, said two chambers constituting the first merging section and the second merging section, respectively.

11. An intake system as claimed in claim 10, wherein:
the throttle casing is disposed in the V-shaped central space; and
the first first upsteam intake passage and the second upstream intake passage are connected to the throttle casing.

12. An intake system as claimed in claim 11, wherein:
the first surge tank is employed for the first cylinder bank and the second surge tank is employed for the second cylinder bank; and
the first connecting tank and the second connecting tank are interposed between the upstream intake passages and the independent intake passages at a location underneath the first upstream intake passage and the second upstream intake passage, each being communicated to the respective first and second surge tanks, and above the first individual intake passages.

13. An intake system as claimed in claim 10, wherein:
a second connecting passage is disposed on each of the first and second surge tanks for communicating between the two chambers; and a second opening-closing valve for opening or closing the second connecting passage is disposed at an intermediate portion of the second connecting passage.

14. An intake system as claimed in claim 10, wherein each of the first and second connecting tanks has wall thickness thicker at a portion immediately below the first intake passage and the second upstream intake passage than at any other portion.

* * * * *